United States Patent [19]

Quackenbush

[11] Patent Number: 4,591,933

[45] Date of Patent: May 27, 1986

[54] DISK DRIVE HEAD POSITIONER WITH OPTIMIZED SEEK OPERATION

[75] Inventor: James E. Quackenbush, Canoga Park, Calif.

[73] Assignee: Computer Memories, Incorporated, Chatsworth, Calif.

[21] Appl. No.: 555,375

[22] Filed: Nov. 28, 1983

[51] Int. Cl.⁴ ............................................. G11B 5/55
[52] U.S. Cl. ...................................................... 360/78
[58] Field of Search ............................ 360/78; 318/561

[56] References Cited

U.S. PATENT DOCUMENTS

| | | | |
|---|---|---|---|
| 4,030,132 | 6/1977 | Iftikar et al. | 360/78 |
| 4,103,314 | 7/1978 | Case | 360/78 |
| 4,217,612 | 8/1980 | Matla et al. | 360/78 |
| 4,237,502 | 12/1980 | Erickson, Jr. et al. | 360/78 |
| 4,314,291 | 2/1982 | Oda et al. | 360/78 |
| 4,333,117 | 6/1982 | Johnson | 360/78 |
| 4,396,959 | 8/1983 | Harrison et al. | 360/77 |

Primary Examiner—George G. Stellar
Attorney, Agent, or Firm—Spensley Horn Jubas & Lubitz

[57] ABSTRACT

The track access time in a disk drive system is minimized by determining an optimum velocity profile each time the system is operated. The optimum velocity profile is determined by performing repeated seek operations with successively higher velocity profiles until a seek failure occurs. A velocity profile slightly lower than the profile which caused failure is then used to control seek operations. During seek operations, the time between track crossings is monitored and the velocity profile reduced if the transducer of the disk drive system is not adequately following the preset velocity profile.

12 Claims, 3 Drawing Figures

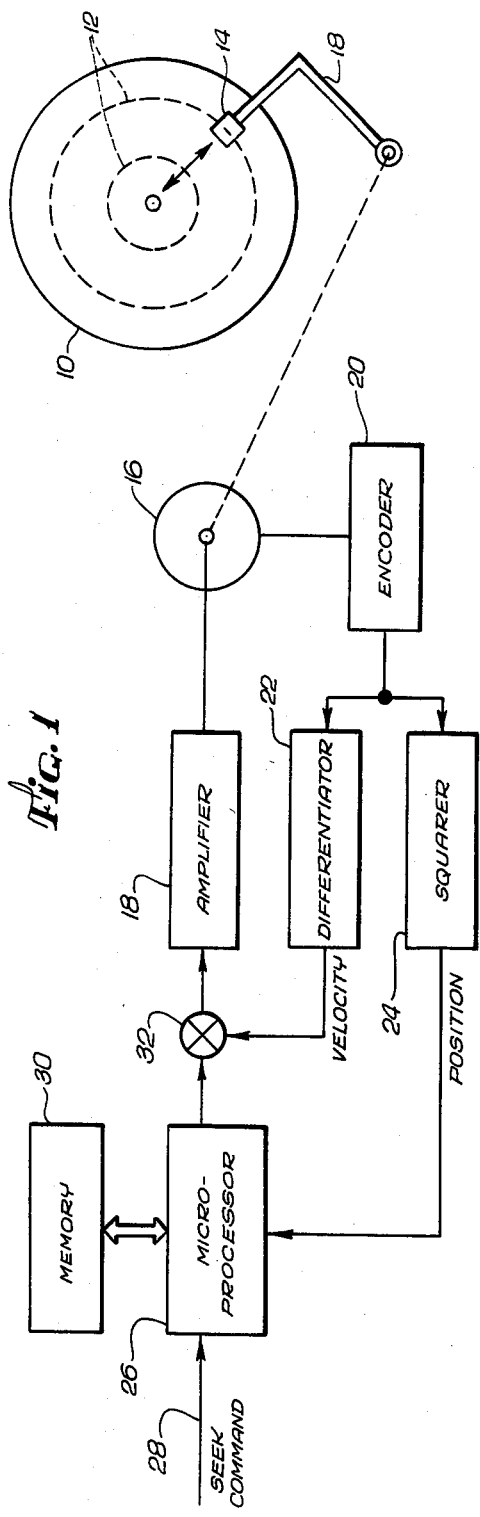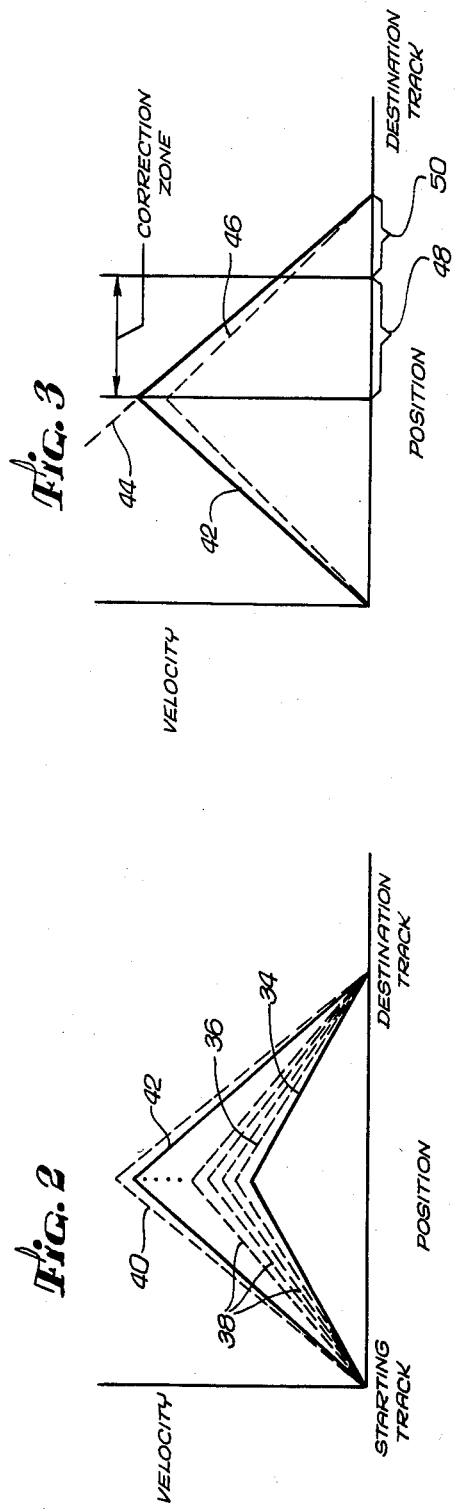

DISK DRIVE HEAD POSITIONER WITH OPTIMIZED SEEK OPERATION

BACKGROUND OF THE INVENTION

1. Field of the Invention

The present invention relates to magnetic disk drive systems. Such systems include one or more magnetic disks, with each disk containing a plurality of concentric data tracks. In order to read information from the disks, a magnetic transducer assembly is radially moved with respect to the disks to a selected data track. One of the critical performance factors of a disk drive system is its access or seek time, i.e., the time it takes to move the transducer assembly from a starting position to a selected destination track. The present invention is directed to a system for reducing the access time in a disk drive assembly.

2. Description of the Prior Art

Most magnetic disk systems currently in use employ a velocity servo system in which for each seek operation, a velocity profile is generated by means of a microprocessor and provides a target velocity as a function of the distance from a designation track. The servo system operates to maintain the velocity of the transducer assembly as close as possible to the velocity profile. Velocity control systems of this type are disclosed in U.S. Pat. Nos. 4,030,132 to Iftikar et al., 4,103,314 to Case, 4,217,612 to Matla et al., 4,237,502 to Erickson, Jr., et al., 4,314,291 to Oda et al., 4,333,117 to Johnson, and 4,396,959 to Harrison et al.

Each of the above patents discloses a system which includes some means of minimizing the access time. In the Iftikar patent, a compensatory signal is provided to the velocity servo control in order to cause the actual motor velocity to follow the program velocity profile more accurately. In Case, position feedback is used in conjunction with velocity control in order to cause the transducer to more accurately follow the predetermined velocity profile. In Oda, a seek operation is performed prior to normal operation in order to determine characteristics of the actuator which is used to move the transducer and the velocity detector which is used in the feedback loop. The determined values are used to automatically adjust the operation of the device in order to compensate for changes in the characteristics of the actuator or velocity detector. The Johnson patent employs a system for digitally determining the head velocity, with the digital determination being compared with a stored velocity profile. The digital determination of velocity is accomplished by measuring the time between successive track crossings.

The Harrison patent employs a first increment of maximum acceleration, a second increment of maximum deceleration and a third increment in which the command amplitude follows a progressive analog staircase which is reset with each detected track crossing. In Erickson, a velocity profile is employed which causes the transducer to creep to the destination track so as to avoid overshoot.

SUMMARY OF THE INVENTION

The present invention is directed to a system in which the access time is reduced to an absolute minimum each time the disk drive system is operated. This is accomplished by employing an initialization routine in which a seek operation is repetitively conducted employing successively increasing velocity profiles. The seek operation is continued until a failure seek occurs, i.e., until there is an overshoot of the destination track by the transducer. The velocity profile is then reduced slightly to a level just below that at which failure occurred. Absolute minimum access time for the system in actual operation is thus assured. Even if the characteristics of the system change over a period of time, minimum access time and error-free operation will be maintained, since the initialization routine insures that an optimum velocity profile will be employed.

In addition to the initialization process, the present invention operates to monitor the operation of the system during each seek to determine if the selected velocity profile is being followed. If not, the velocity profile is reduced by a predetermined scale factor and the remainder of the seek operation is performed in accordance with the corrected velocity profile.

BRIEF DESCRIPTION OF THE DRAWINGS

The invention will be described with reference to the accompanying drawings, wherein:

FIG. 1 is a block diagram of the invention;

FIG. 2 is a diagram illustrating the initialization process; and

FIG. 3 is a diagram illustrating the velocity profile correction made during a seek operation.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by reference to the appended claims.

Referring to FIG. 1, a disk drive system includes one or more concentric rotatable disks 10, each containing a plurality of concentric data tracks 12. Present disk drive systems may have a track density of up to seven hundred tracks per inch. A transducer assembly 14 containing one or more transducers for reading information from the disks is radially movable with respect to the disks in order to access a desired track. The movement of the transducer is accomplished by a drive motor 16 coupled to the transducer by a mechanical swing arm assembly 18. The transducer assembly 14 may be driven by any one of several different methods known in the art, such as a rotary motor and mechanical coupling assembly as shown or by employing a linear voice coil actuator.

The motor 16 is driven by an amplifier 18. The position of the motor, and thus the transducer assembly, is detected by means of an encoder 20. The encoder provides a sinusoidal output and is calibrated to have a zero crossing corresponding to each track 12 on the disk 10. The output of the encoder 20 is fed to a differentiator 22 which differentiates the output signals to provide a signal proportional to velocity and to a squarer 24 which provides a digitial position indication signal.

The position signal from the squarer 24 is provided to a microprocessor 26. The microprocessor keeps track of the track location of the transducer 14 based upon signals from the squarer 24. Upon receipt of a seek command on line 28, the microprocessor compares the present location of the transducer 14 with its desired location and generates a velocity profile for that particular seek operation which has previously been stored in a memory 30. The velocity profile contains velocity commands corresponding to the distance of the transducer from the destination track. This distance is determined by monitoring the position signals from the squarer 24. The memory 30 stores a plurality of velocity profiles, with a specific profile being stored for each different seek distance.

The velocity command output of the microprocessor 26 is compared to the instantaneous velocity of the transducer at a summing junction 32. The output of the summing junction is an error signal representing the difference between the desired and actual velocity of the transducer. This signal is used to drive the amplifier 18 which in turn drives the motor 16.

The components and operation of the system thus described are typical for disk drive systems. The present invention provides for optimization of the operation of such a system by incorporating a unique method of determining the velocity profile which is to be used to control seek operations.

Referring to FIG. 2, upon the application of power to the disk drive system, the microprocessor 26 executes an initialization routine by causing a plurality of successive seek operations to be performed. A fundamental velocity profile 34 is stored in the memory 30. This profile is typically well below the optimum profile for achieving minimum access time. Initially, a seek of a predetermined distance is performed in accordance with the velocity profile 34. If this seek is successful (i.e., the destination track is not overrun), the velocity profile 34 is multiplied by a predetermined scale factor to obtain a new velocity profile 36 corresponding to a reduced seek time. A second seek operation for the same distance is then performed under the control of the new velocity profile. The seek operation is repeated with velocity profiles 38 which correspond to the fundamental profile multiplied by a scale factor which is increased with each successive seek. The seek operations are continued until a velocity profile is reached which causes a seek to fail, i.e., which causes the transducer to overshoot the destination track. This velocity profile is indicated at 40 in FIG. 2. When the velocity profile which causes a seek to fail has been determined, the scale factor for multiplication of the fundamental velocity profile is reduced by a predetermined amount (ten percent in the present embodiment) in order to obtain an operating velocity profile 42. During normal seek operations, the memory 30 will provide the fundamental profile 34 and the microprocessor will multiply it by the appropriate scale factor in order to cause the system to operate in accordance with the velocity profile 42. Alternatively, an entirely new velocity profile corresponding to the profile 42 could be stored in the memory 30.

The scale factor determined on the basis of the initialization seeks is applied to the velocity profile stored for each seek distance. In operation, therefore, the family of fundamental velocity profiles corresponding to various seek distances which are stored in the memory 30 will all be multiplied by the scale factor determined from the initialization seeks.

Thus, the velocity profiles which will be used during normal seek operations will correspond to the maximum profiles at which proper operation will be achieved. This ensures that the access time of the system will be minimized. Since the velocity profile determination occurs each time the disk drive is operated, changes in the characteristics of the system will not affect its operation other than to cause the system to operate in accordance with different velocity profiles. In this regard, it should be noted that deterioration in the performance of the system will not cause faulty seeks to occur but instead will simply increase the access time due to the reduced velocity profile which must be employed. The system thus has the inherent advantage of being relatively error-proof in its seek operation.

The velocity profiles shown in FIG. 2 are comprised of an acceleration phase during which the difference between the command velocity output by the microprocessor and the actual velocity of the positioner is large. This causes the positioner to accelerate at a constant maximum value at maximum current until difference between actual value of velocity and the commanded velocity becomes zero. At that point the positioner enters a deceleration phase in which the magnitudce of the deceleration is somewhat less than the maximum allowed by the system. This deceleration phase continues until the destination track is reached. It should be noted, however, that the present invention could be incorporated with velocity profiles other than the triangular profile shown. Whatever type of velocity profile is employed, the fundamental operation of the system is to provide an initialization operation in which optimum velocity profiles are determined and subsequently to perform seek operations in accordance with the determined profiles.

Because the seek operations are performed in accordance with velocity profiles which are near the limits of the system, occasions may arise in which operation in accordance with a particular profile will result in a seek failure. The present invention operates in a fashion to minimize this potential. During a regular seek operation, the movement of the transducer is monitored to determine if the velocity profile is being followed. If not, the velocity profile is automatically reduced in order to prevent the transducer from overrunning the destination track.

The operating velocity profile 42 determined during the initialization phase is illustrated in FIG. 3. The deceleration portion of the profile has a fixed slope, as indicated at 44. During deceleration, therefore, the transducer velocity times the time between track crossings should remain constant (distance between tracks=-velocity×time between tracks=constant). During the initialization phase, the time between track crossings is monitored and a constant corresponding to the deceleration portion of the velocity profile 42 is determined by the processor 26. During subsequent seek operations, the time between track crossings is again monitored and multiplied by the corresponding of velocity profile velocity value to determine if the constant is being followed. If the velocity of the transducer is too high, the time between track crossings will be reduced and the product of the time between track crossings and the profile command velocity will be less than the constant. If this situation occurs, it serves to provide an indication that the the operating velocity profile which was determined in the initialization operation is too high. In response to this determination, the microprocessor will automatically reduce the scale factor so as to change the velocity profile to a lower level as indicated at 46 in FIG. 3. This correction is accomplished during the seek operation and helps to ensure that the transducer will not overrun the destination track.

The monitoring operation during a seek is only carried out during an initial portion 48 of the deceleration phase. Within this "correction zone" a change in the velocity profile can affect the motion of the transducer to an extent sufficient to prevent it from overrunning the destination track. During the period 50 corresponding to approximately forty tracks from the destination track, no velocity profile correction is accomplished, since it would not have any substantial effect on the remaining motion of the transducer.

If a seek fails, the microprocessor 26 controls the motor to drive the transducer back to a reference track (as opposed to the starting track) and the scale factor for the velocity profile is reduced by a predetermined amount, e.g., ten percent. A new seek to the destination track from the reference track under the control of the reduced velocity profile is then performed.

For seeks of a relatively short distance, the fundamental velocity profile is multiplied by the scale factor determined during the initialization operation and by a predetermined formula to further reduce the velocity profile to achieve accurate seeking. For such seek distances, no correction of the velocity profile during the seek operation is carried out.

The programming of the microprocessor 26 to achieve the desired operation of the system during both the initialization and normal modes of operation is well within the ability of one of ordinary skill in the art and will not be described in detail. It should noted, however, that the desired operation of determining optimum velocity profiles each time the system is used can be accomplished in many different fashions. The described embodiment is the preferred method of operation but certainly is not exclusive.

Thus, the present invention provides a system and method for controlling seek operations in a disk drive system so that minimum access time is achieved and failure seeks are minimized. This is accomplished by determining optimum velocity profiles for the system prior to each operation of the system. The velocity profile can be reduced during a seek operation if it is determined that the present velocity profile is not being followed accurately enough to ensure that the destination track will not be overrun. In the event that the destination track is overrun, the velocity profile is reduced and a new seek initiated.

What is claimed is:

1. In a disk drive system in which a transducer is moved between data tracks during seek operations in accordance with velocity profiles containing velocity commands corresponding to the distance from a destination track during each seek operation, the method for minimizing seek time comprising the steps of:
    determining a velocity profile for each seek distance prior to each time the disk drive system is to be operated; and
    operating the disk drive in accordance with the determined velocity profiles.

2. The method of claim 1 wherein the step of determining includes the steps of performing a plurality of seek operations for a first predetermined distance under the control of different velocity profiles to determine an optimum velocity profile for the first distance, and determining velocity profiles for other seek distances based upon the velocity profile determined for the first distance.

3. The method of claim 2 including the steps of sequentially providing velocity profiles corresponding to reduced seek times, performing said plural seek operations until an error in seeking occurs, and adopting a velocity profile corresponding to a seek time slightly greater than that of the profile which resulted in an error.

4. The method of claim 3 wherein the step of sequentially providing velocity profiles includes the steps of providing a fundamental velocity profile and multiplying the profile by a scale factor which increases with each seek operation, wherein the scale factor for the velocity profile which is adopted as optimum is slightly less than the scale factor for the velocity profile which resulted in an error.

5. The method of claim 4 wherein the step of determining velocity profiles for other seek distances comprises the steps of providing a fundamental velocity profile for each seek distance and multiplying said fundamental profile by said adopted scale factor.

6. The method of claim 1 wherein the step of operating the disk drive includes the step of monitoring the operation of the disk drive during each seek operation and providing a new velocity profile for the remainder of the seek operation if the velocity profile being used is not being properly followed.

7. The method of claim 5 wherein the step of operating the disk drive includes the step of monitoring the operation of the disk drive during each seek operation and providing a new velocity profile for the remainder of the seek operation if the velocity profile being used is not being properly followed.

8. The method of claim 6 wherein the step of providing a new velocity profile includes the step of reducing the scale factor by which the fundamental velocity profile is multiplied.

9. The method of claim 6 wherein the velocity profiles include an acceleration portion followed by a deceleration portion, the method including the step of determining the value of a constant corresponding to the velocity of the transducer times the time it takes to move between adjacent data tracks during deceleration, wherein the step of monitoring includes the steps of monitoring the time it takes to move between selected data tracks, multiplying the monitored time values by velocity profile values corresponding to the selected data tracks and comparing the product with the previously determined constant.

10. A disk drive system comprising:
    a disk having a plurality of concentric data tracks thereon;
    a transducer for reading information from the data tracks;
    positioner means for moving the transducer between data tracks during seek operations;
    control means for controlling the positioner to move the transducer in accordance with predetermined velocity profiles containing velocity commands corresponding to the distance of the transducer from a destination track; and
    initialization means, operational prior to each use of the disk drive system, for determining an optimum velocity profile for each seek distance.

11. A disk drive system according to claim 10 wherein the control means and initialization means comprises processor means for (a) causing the system to perform a plurality of initialization seek operations of a predetermined distance in accordance with different velocity profiles during an initialization operation, and (b) determining an optimum velocity profile for each seek distance based upon the plurality of seek operations.

12. A disk drive system according to claim 11 wherein the processor means includes memory means storing a fundamental velocity profile for different seek distances, wherein said processor means provides said different velocity profiles for said initialization seek operations by sequentially multiplying the fundamental velocity profile by an increasing scale factor, wherein said processor means causes successive seek operations to be performed until a seek fails in order to determine a scale factor for optimum seeking operation, wherein during operation the processor means multiplies the fundamental velocity by said scale factor.

* * * * *